(12) United States Patent
Baribault

(10) Patent No.: US 10,900,866 B2
(45) Date of Patent: Jan. 26, 2021

(54) OPTICAL FIBER ENDFACE INSPECTION WITH OPTICAL POWER MEASUREMENT

(71) Applicant: EXFO Inc., Quebec (CA)

(72) Inventor: Robert Baribault, Quebec (CA)

(73) Assignee: EXFO Inc., Québec (CA)

( * ) Notice: Subject to any disclaimer, the term of this patent is extended or adjusted under 35 U.S.C. 154(b) by 0 days.

(21) Appl. No.: 16/447,383

(22) Filed: Jun. 20, 2019

(65) Prior Publication Data
US 2019/0391041 A1    Dec. 26, 2019

Related U.S. Application Data

(60) Provisional application No. 62/688,558, filed on Jun. 22, 2018.

(51) Int. Cl.
*G01M 11/08* (2006.01)
*G01M 11/00* (2006.01)

(52) U.S. Cl.
CPC .......... *G01M 11/088* (2013.01); *G01M 11/30* (2013.01)

(58) Field of Classification Search
CPC ............................ G01M 11/088; G01M 11/30
See application file for complete search history.

(56) References Cited

U.S. PATENT DOCUMENTS

| | | | |
|---|---|---|---|
| 7,423,806 B2 | 9/2008 | Uhl et al. | |
| 7,663,740 B2 | 2/2010 | Lu | |
| 8,908,167 B2 | 12/2014 | Flora et al. | |
| 9,841,579 B2 | 12/2017 | Baribault | |
| 9,915,790 B2 | 3/2018 | Baribault | |
| 9,995,649 B2 | 6/2018 | Schell et al. | |
| 2008/0129985 A1* | 6/2008 | Laffont | G01N 21/431 356/128 |
| 2008/0278709 A1 | 11/2008 | Lu | |
| 2013/0038864 A1* | 2/2013 | Flora | G02B 21/0016 356/73.1 |
| 2015/0092043 A1* | 4/2015 | Baribault | G02B 7/1822 348/125 |
| 2016/0170151 A1* | 6/2016 | Baribault | G02B 6/381 356/73.1 |
| 2017/0003195 A1* | 1/2017 | Lafrance | G01M 11/30 |

OTHER PUBLICATIONS

Viavi, PowerChek Optical Power Meter, Viavi Solutions, Inc., 2015.
JDSU, HP3 Series Fiber Inspection and Test System with Compact Video Display, JDS Uniphase Corporation, Mar. 2011.
Lightel, ViewConn Plus Connector Inspection and Cleaning, www.lightel.com, downloaded Jan. 11, 2018.

\* cited by examiner

*Primary Examiner* — Jamil Ahmed
(74) *Attorney, Agent, or Firm* — Helene Chotard

(57) ABSTRACT

There is provided an optical-fiber connector endface inspection microscope system comprising optical power measurement capability, wherein optical power measurement is provided via an optical power meter device implemented within an extension unit positioned along an optical path between the inspected optical-fiber connector endface and the optical-fiber connector endface inspection microscope, i.e. between the inspected optical-fiber connector endface and objective optics of the optical-fiber connector endface inspection microscope.

16 Claims, 11 Drawing Sheets

OPTICAL FIBER ENDFACE INSPECTION WITH OPTICAL POWER MEASUREMENT

CROSS-REFERENCE TO RELATED APPLICATIONS

This application claims priority under 35 USC § 119(e) of U.S. provisional patent application(s) 62/688,558 filed Jun. 22, 2018; the specifications of which is hereby incorporated by reference.

TECHNICAL FIELD

The present description generally relates to optical-fiber connector endface inspection, and more particularly, to optical-fiber connector endface inspection microscopes comprising both optical power measurement and connector endface inspection capabilities.

BACKGROUND OF THE ART

The quality and cleanliness of endfaces of optical-fiber connectors represent important factors for achieving expected system performance of optical communication networks. Indeed, any contamination of or damage on the mating surface of an optical-fiber connector may severely degrade signal integrity. Optical-fiber connector endface inspection microscopes are commonly employed to inspect the endface of an optical-fiber connector at installation or during maintenance of optical communication networks, in order to verify the quality of the optical-fiber connection.

Some optical-fiber inspection microscope probes also include a separate power detection port which allows the operator to measure the optical power of light exiting the optical-fiber connector. The operator is required to sequentially connect the optical-fiber connector under inspection to the inspection microscope port and to the power detection port. Of course, additional handling of optical-fiber connectors increases the risk of potential contamination of the connector endface.

U.S. Pat. No. 8,908,167 to Flora et al. proposes an optical-fiber inspection microscope configuration that includes an integrated optical power measurement assembly such that endface inspection and power measurement may be conducted using the same port.

U.S. Pat. No. 9,915,790 to Baribault proposes an optical-fiber inspection microscope configuration that includes an integrated optical power measurement assembly, and which is suitable for both angularly-polished (e.g. FC/APC) and perpendicularly-polished (e.g. FC/PC) optical-fiber connectors.

The configurations of both Flora et al. and Baribault require the optical-fiber inspection microscope to be originally designed to accommodate optical power measurement capabilities.

Although existing optical-fiber inspection microscope probes are satisfactory to a certain degree, there remains room for improvement, particularly in terms of providing a fiber inspection microscope system comprising a optical power measurement function.

SUMMARY

Accordingly, in accordance with one aspect, there is provided an optical-fiber connector endface inspection microscope system comprising optical power measurement capability, wherein optical power measurement is provided via an optical power meter device implemented within an extension unit positioned along an optical path between the inspected optical-fiber connector endface and the inspection microscope, i.e. between the inspected optical-fiber connector endface and objective optics of the inspection microscope.

Positioning the optical power meter device outside of the imaging system of the inspection microscope advantageously allows optimization of the optical design of the optical power measurement assembly without affecting the optical design of the imaging assembly of the inspection microscope, which is optimized for connector endface inspection. As will be understood, the optical spectrum of light used in endface inspection (referred to herein as the inspection light beam) is different from the optical spectrum of light of which the optical power is to be measured (referred to herein as the signal light beam). Because the focal length of lenses typically varies with wavelength, objective optics of the inspection microscope has different focal lengths for the signal light beam and the inspection light beam. The objective optics and the focusing function of the inspection microscope is not optimized for capturing and focusing the signal light beam (the imaging assembly is configured to focus the inspection light beam on the image sensor, not the signal light beam). Redirecting or otherwise splitting the signal light beam from the inspection light beam before it reaches objective optics of the optical-fiber connector endface inspection microscope allow better optimization of the signal light beam capture and focusing on the optical power detector. Furthermore, if the signal light beam were to pass through the objective optics and focusing function, its focus on the optical power detector would be caused to vary, thereby causing variability in the optical power measurement responsivity. Redirecting or otherwise splitting the signal light beam before it reaches the objective optics obviates this issue as a whole. Minimizing the number of optical components through which the signal light beam passes also provides better stability in optical power measurement responsivity.

In some embodiments, the optical power meter device is releasable from the optical-fiber connector endface inspection microscope. Such configuration may advantageously allow an existing inspection microscope without optical power measurement capability to be converted into a system having integrated optical power measurement capability such that both endface inspection and optical power measurement may be conducted using a common connection port, without modifying the existing optical-fiber connector endface inspection microscope. In some embodiments, the optical power meter extension unit can be retrofitted to inspection microscopes that are already in possession of customers or end users without any need to return the existing inspection microscope to manufacture or maintenance. A releasable optical power meter device may also advantageously allow an inspection microscope to be used either with or without the optical power measurement capability, depending on user needs. In some further embodiments, the optical power meter extension unit may be configured to be also usable as a standalone device, i.e., without an inspection microscope, in order to measure optical power measurement only.

In accordance with one aspect, there is provided an optical power measurement device for use with an optical-fiber connector endface inspection microscope having, at an inspection end, objective optics defining an object plane, comprising:

a housing structure comprising: a first end connectable toward an optical-fiber connector endface to be inspected; and a second end toward the inspection end of said optical-fiber connector endface inspection microscope;

an imaging path within said housing structure between said first end and said second end along which an inspection light beam reflected from the connector endface propagates toward the second end;

a relay lens system along the imaging path, comprising at least a first converging optics at said first end, said relay lens system producing an image of the optical-fiber connector endface to be inspected on an object plane of the optical-fiber connector endface inspection microscope;

an optical power detector; and beam redirection optics disposed along the optical imaging path between the optical-fiber connector endface to be inspected and objective optics of said optical-fiber connector endface inspection microscope, said beam redirection optics being configured to split at least part of light exiting the optical-fiber connector endface from the inspection light beam to direct the at least part of light exiting the optical-fiber connector endface toward said optical power detector.

In accordance with one aspect, there is provided an optical-fiber connector endface inspection microscope and optical power measurement system, comprising:
an optical-fiber connector endface inspection microscope having objective optics at an inspection end; and
optical power measurement device comprising:

a housing structure comprising: a first end connectable toward an optical-fiber connector endface to be inspected; and a second end toward the inspection end of said optical-fiber connector endface inspection microscope;

an imaging path within said housing structure between said first end and said second end along which an inspection light beam reflected from the connector endface propagates toward the second end;

a relay lens system along the imaging path, comprising at least a first converging optics at said first end, said relay lens system producing an image of the optical-fiber connector endface to be inspected on an object plane of the optical-fiber connector endface inspection microscope;

an optical power detector; and beam redirection optics disposed along the optical imaging path between the optical-fiber connector endface to be inspected and objective optics of said optical-fiber connector endface inspection microscope, said beam redirection optics being configured to split at least part of light exiting the optical-fiber connector endface from the inspection light beam to direct the at least part of light exiting the optical-fiber connector endface toward said optical power detector.

In some embodiments, said housing structure may be releasably connectable to a microscope housing of the optical-fiber connector endface inspection microscope via said second end. Such configuration may advantageously allow an existing optical-fiber connector endface inspection microscope without optical power measurement capability to be converted into a system having integrated optical power measurement capability, without modifying the existing optical-fiber connector endface inspection microscope.

In some embodiments, said first end of said housing structure may be releasably connectable to a connector-mating interface tip adapted to connect to an optical-fiber connector endface to be inspected. The connector-mating interface tip allows the optical-fiber connector endface inspection microscope and optical power measurement device to be used for a variety of configurations of optical-fiber connectors such as, e.g., LC/PC, LC/APC, SC/PC, SC/APC or FC/APC connectors as known in the art.

In some embodiments, said housing structure may be releasably connectable to a microscope housing of the optical-fiber connector endface inspection microscope via said second end; said first end of said housing structure may be releasably connectable to a connector-mating interface tip adapted to connect to an optical-fiber connector endface to be inspected; and said connector-mating interface tip may be releasably connectable to said inspection end of the optical-fiber connector endface inspection microscope in absence of the optical power measurement device. Such configuration allows an existing optical-fiber connector endface inspection microscope configured to be used with interchangeable connector-mating interface tips, to be converted into a system having integrated optical power measurement capability which may also be used for a variety of configurations of optical-fiber connectors via either an existing set of connector-mating interface tips or a similar set of connector-mating interface tips.

In some embodiments, said optical power detector may be disposed within said housing structure.

In some embodiments, said optical power detector may be external to said housing structure and said optical power measurement device may further comprise an optical waveguide connected to said housing structure, and coupling optics disposed within said housing structure and configured to couple said at least part of light exiting the optical-fiber connector endface to said optical waveguide.

In some embodiments, a magnification factor associated with said relay lens system may be 1×.

In some embodiments, said relay lens system may further comprise second converging optics at said second end.

In some embodiments, the optical-fiber connector endface inspection microscope may comprise an imaging assembly comprising said objective optics and an image detector, the imaging assembly being configured to illuminate the optical-fiber connector endface and to image the illuminated endface on said image detector for inspection thereof.

In accordance with another aspect, there is provided a method for inspecting an optical-fiber connector endface and measuring an optical power of light the same, the method comprising: connecting an optical power measurement device between an inspection end of an optical-fiber connector endface inspection microscope and a connector-mating interface tip; connecting an optical-fiber connector endface to be inspected to said connector-mating interface tip; defining an imaging path within a housing structure of the optical power measurement device, between said optical-fiber connector endface and objective optics of said optical-fiber connector endface inspection microscope, to convey an inspection light beam reflected from the connector endface toward said objective optics; producing an image of the optical-fiber connector endface to be inspected on the object plane of the optical-fiber connector endface inspection microscope via a pair of converging lenses; capturing an image of the optical-fiber connector endface via the optical-fiber connector endface inspection microscope, for inspection thereof; splitting at least part of light exiting the optical-fiber connector endface from the inspection light beam to direct the at least part of light exiting the optical-fiber connector endface toward an optical power detector, via a beam redirection element disposed along the optical imaging path between the optical-fiber connector endface to be inspected and said objective optics of said optical-fiber connector endface inspection microscope; and determining an optical power value of said light exiting the optical-fiber connector endface from an output of the optical power detector.

For ease of reading, in the following description, the "optical-fiber connector endface inspection microscope" and the "optical-fiber connector endface inspection microscope system" may be referred to respectively as an "inspection microscope" and an "inspection microscope system". Similarly, the "optical power measurement device" may be referred to as a "power measurement device" or simply "PM device"; the "optical-fiber connector endface" may be referred to as a "connector endface" or simply "endface"; and the "connector-mating interface tip" may be referred to as an "interface tip" or simply a "tip".

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

Other features and advantages of the present description will become more apparent upon reading of the following non-restrictive description of specific embodiments thereof, given by way of example only with reference to the appended drawings.

In the present description, the terms "light" and "optical" are used to refer to radiation in any appropriate region of the electromagnetic spectrum. More particularly, the terms "light" and "optical" are not limited to visible light, but can include, for example, the infrared wavelength range. For example, in some embodiments, the light exiting the connector endface can have a wavelength spectrum lying somewhere in the range from about 850 nm to about 1625 nm; and the illumination source can be embodied emit light in the blue region, e.g., at about 470 nm, or any other suitable spectral region within the visible spectrum, the near ultraviolet spectrum or the near infrared spectrum. Those skilled in the art will understand, however, that these wavelength ranges are provided for illustrative purposes only and that the present techniques may operate beyond these ranges.

BRIEF DESCRIPTION OF THE DRAWINGS

Further features and exemplary advantages of the present invention will become apparent to the skilled person from the following detailed description, taken in conjunction with the appended drawings.

It will be noted that throughout the appended drawings, like features are identified by like reference numerals.

Figure 1A:
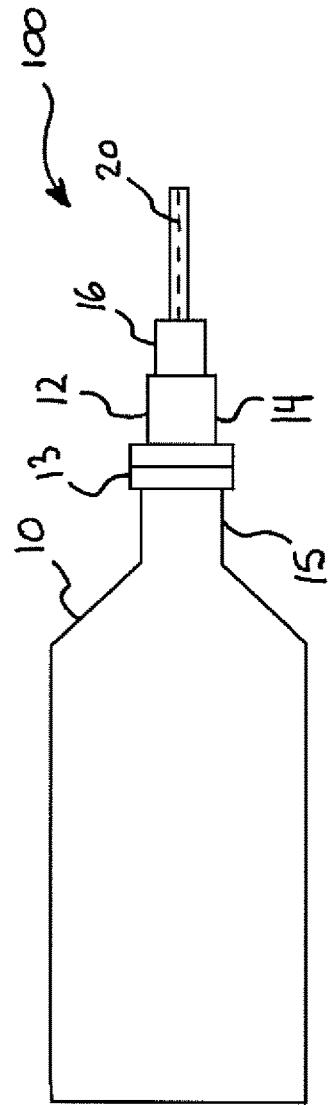
FIG. 1A is a schematic side view of an inspection microscope system comprising an inspection microscope and a connector-mating interface tip connectable to an inspection end of the inspection microscope, in accordance with prior art inspection microscopes.

It should also be understood the when the appended drawings are denoted as schematics, elements of the drawings are not necessarily drawn to scale. Some mechanical or other physical components may also be omitted in order to not encumber the figures.

In the following description, similar features in the drawings have been given similar reference numerals and, to not unduly encumber the figures, some elements may not be indicated on some figures if they were already identified in a preceding figure. It should be understood herein that the elements of the drawings are not necessarily depicted to scale, since emphasis is placed upon clearly illustrating the elements and structures of the present embodiments.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be are omitted to enhance clarity and conciseness.

Although some features may be described with respect to individual exemplary embodiment, aspects need not be limited thereto such that features from one or more exemplary embodiment may be combinable with other features from one or more exemplary embodiments.

DETAILED DESCRIPTION

Optical connectors normally need to be inspected when they are connected and disconnected from one another. Typically, the procedure involves sequential steps of measuring an optical power value using an optical power detector and visually inspecting the optical-fiber connector endface using a fiber inspection microscope. However, undesirable particles can be deposited on the endface of the optical fiber while manipulating the optical fiber from the fiber inspection probe to the optical power detector, for instance. To circumvent this drawback, some have proposed fiber inspection probes adapted to inspect optical-fiber connector endfaces, which would incorporate both an optical-fiber endface imaging assembly and an optical power detection assembly. Such inspection probes would allow performing the two steps mentioned above in a single step, thus reducing the risk of contamination. However, such solutions imply a redesign of the existing inspection microscopes in order to introduce power measurement capabilities along the inspection path. The following disclosure describes an optical power measurement device that can be permanently or releasably attached to an inspection microscope to provide both connector endface inspection capability and power measurement capability on a common connection port, without requiring modification to the inspection microscope configuration, including its optical design (location and properties of lenses, mirrors, beamsplitters, illumination source, photodetectors, etc.) and its mechanical design (translation stages, fixtures, etc.) which, when coupled to a fiber inspection microscope and power measurement probe, allows inspection of connectors, as well as power measurement.

Figure 1B:
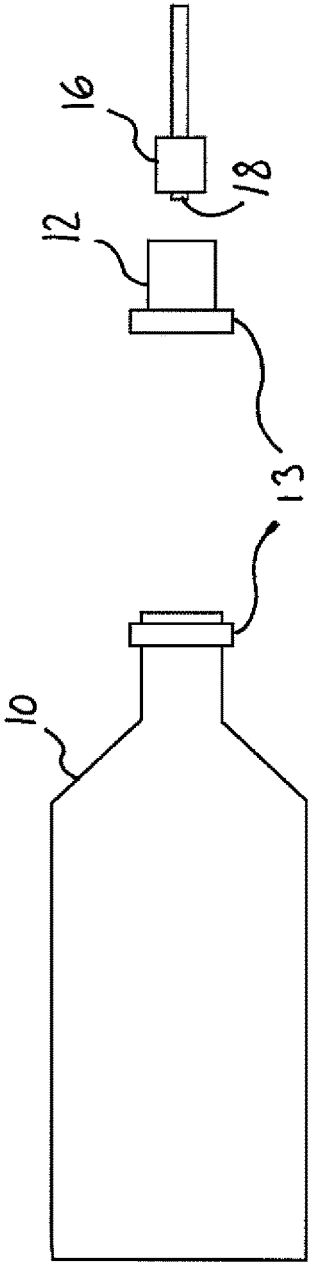
FIG. 1B is a schematic side view of the inspection microscope system of FIG. 1 in which the connector-mating interface tip and the connector are shown disconnected from the inspection microscope.

FIG. 1A shows a schematic side view of a prior art inspection microscope system 100 comprising an inspection microscope 10 and a connector-mating interface tip 12 connectable to an inspection end 15 of the inspection microscope 10, in accordance with prior art inspection microscopes. As known in the art and as shown in FIG. 1B, the interface tip 12 is releasably connectable to the inspection microscope 10 via a connection mechanism 13, and is typically interchangeable with other connector-mating interface tips in order to adapt the connector-mating interface 14 of the inspection microscope system 100 to different configurations of optical-fiber connectors such as, e.g., LC/PC, LC/APC, SC/PC, SC/APC or FC/APC connectors or bulkhead adapters as known in the art, by mechanically engaging with the connector 16 or a bulkhead adapter in which lies an optical-fiber connector endface 18 (see FIG. 1B) to be inspected. The connector 16 typically has a ferrule end (not shown) that is perpendicular to a propagation axis 20 of one or more optical fibers (not shown). The connector endface 18 coincides with the ferrule end. The inspection end 15 of an inspection microscope herein generally refers to the end of an inspection microscope that is adapted to receive the connector endface 18 for optical magnification thereof, by connecting directly (i.e. mechanical engagement) or indirectly (e.g. via an interface tip) with an optical-fiber connector or bulkhead adapter to be inspected.

FIG. 1B shows a schematic side view of the inspection microscope system 100 in which the connector-mating interface tip 12 and the connector 16 are shown disconnected from the inspection microscope 10. The interface tip 12 can be disconnected from the inspection microscope 10 by opening the connection mechanism 13.

Figure 1C:
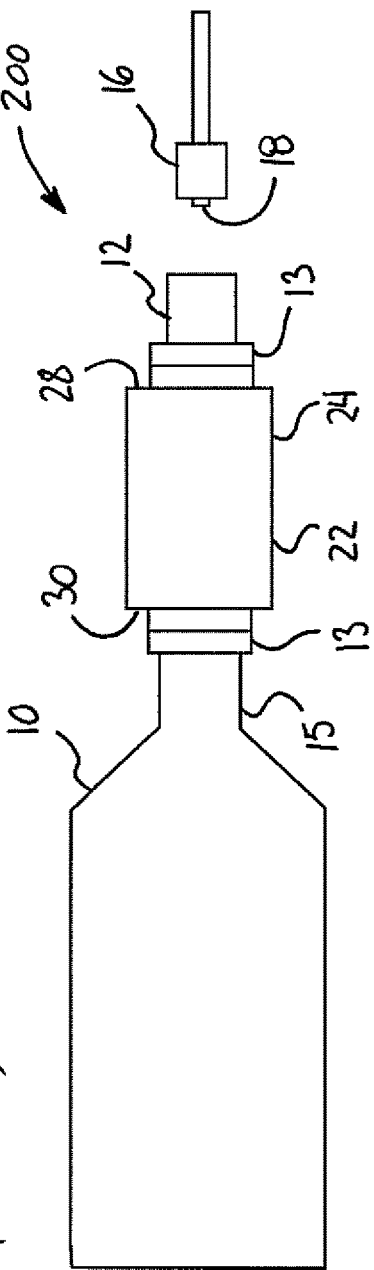
FIG. 1C is a schematic side view of an embodiment of an inspection microscope system comprising an optical power measurement device so as to provide both optical power measurement and connector endface inspection capabilities.

FIG. 1C shows a schematic side view of an embodiment of an optical-fiber connecter endface inspection microscope system 200 that is configured to provide both optical power measurement and connector endface inspection capabilities. The inspection microscope system 200 comprises the optical-fiber connector endface inspection microscope 100, the connector-mating interface tip 12 and an optical power measurement device 22 that is embodied as an extension unit 24 releasably connectable between the inspection end 15 of the inspection microscope 10 and the interface tip 12.

In the embodiment of FIG. 1C, the inspection microscope system 200 advantageously integrates an existing optical-fiber connector endface inspection microscope and connector-mating interface tip but it will be understood that, in other embodiments, the optical power measurement device 22 may be made to be combined with redesigned inspection microscopes and interface tips, depending on the commercial application. The optical power measurement device 22 may also be made permanently attached to an inspection microscope.

The power measurement device 22 has a generally elongated hollow housing structure 26 having a first end 28 connectable toward an optical-fiber connector endface 18 to be inspected and a second end 30 connectable toward the inspection end 15 of the optical-fiber connector endface inspection microscope. An imaging path 32 is defined within the housing structure 26 between the first end 28 and the second end 30 to convey an image of the connector endface 18 toward the inspection end 15 of the inspection microscope 10.

In the embodiment of FIG. 1C, the housing structure 26 indirectly connects toward the connector endface 18 via the interface tip 12. The interface tip 12 releasably connects to the housing structure 26 and the housing structure 26 releasably connects to the inspection microscope 10 via corresponding connection mechanisms 13 that are both equivalent or compatible to that interconnecting interface tip 12 to the inspection microscope 10, so that the optical power measurement device 22 can be seamlessly inserted between the inspection microscope 10 and the interface tip 12.

It will be understood that, in other embodiments, the interchangeable tips can be omitted to connect the connector endface 18 directly to the optical power measurement device 22, for example, if the optical power measurement device 22 is made for specific use with a single one or a limited number of connector configurations. As such, the first end 28 of the housing structure may be either releasably connectable to the connector or bulkhead adapter to be inspected or releasably connectable to an interface tip 12.

Also, in other embodiments, the optical power measurement device 22 may be made permanently attached to or integrated into the inspection microscope 10.

As will be understood, the following description applies equivalently to single-fiber and multi-fiber connectors made to interconnect either single-mode or multimode fibers. The inspection microscope system 200 can be adapted to receive such different configurations of optical-fiber connectors by connecting the corresponding connector-mating interface tip 12.

FIGS. 2 to 10 are schematic views of various examples of the optical configuration of the inspection microscope system 200 of FIG. 1C.

Figure 2:
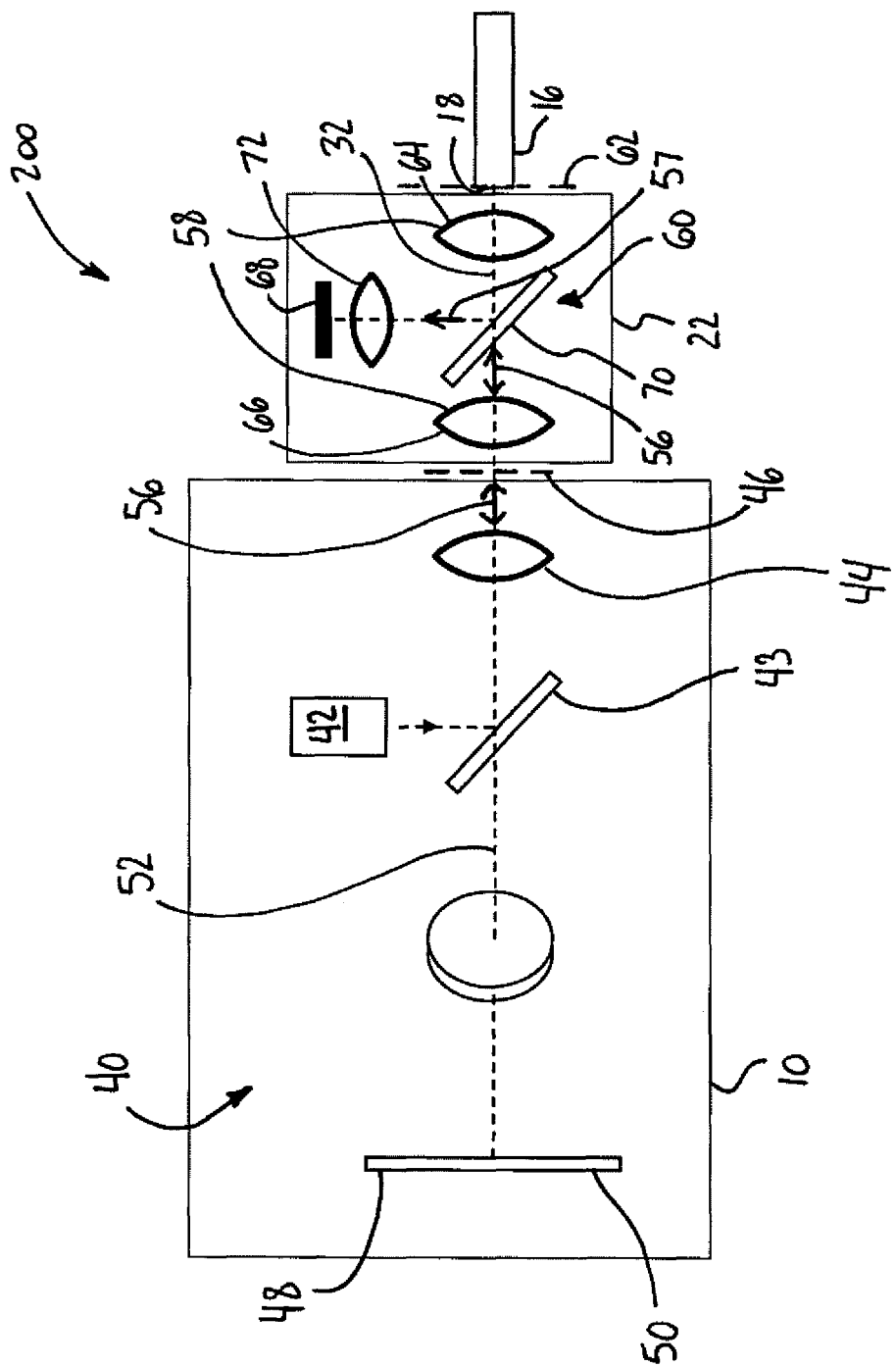
FIG. 2 is a schematic side view showing an optical configuration of an inspection microscope system in accordance with one embodiment in which the optical-fiber connector to be inspected is disposed in line with the inspection microscope.

Now referring to FIG. 2, there is shown a schematic side view of an example of an optical configuration of the inspection microscope system 200 of FIG. 1C comprising an optical-fiber connector endface inspection microscope 10 and an optical power measurement device 22. In this figure as well as in FIGS. 3 to 11, the interface tip 12, the housing structure 26, the connection mechanisms 13 as well as other mechanical and electronic components are omitted in order not to encumber the figures.

As will be understood by one skilled in the art, the inspection microscope 10 incorporates an imaging assembly 40 comprising an illumination source 42 for illuminating the connector endface 18 to be inspected, an illumination beam splitter 43 to direct illumination light toward the connector endface 18, an image sensor 50, and imaging optics, including an objective lens 44 (and optionally other lenses, mirrors and/or other optical components defining objective optics), for imaging the illuminated connector endface 18 located on an object plane 46 of the inspection microscope 10, on an image plane 48 coinciding with the image sensor 50. The object plane 46 as defined herein is determined by the objective lens 44 and, in absence of the optical power measurement device 22, coincides with the plane where the connector endface 18 to be inspected (i.e. the object) should be positioned (within the focusing range of the imaging assembly 40) to be suitably imaged on the image plane 48. The optical path between the object plane 46 and the image plane 48 defines an imaging path 52 of the inspection microscope, along which propagates the inspection light beam 56 resulting from a reflection of illumination light on the connector endface 18, for optical magnification of the object (i.e. the connector endface 18) positioned on the object plane 46.

Optionally, the imaging assembly 40 may further comprise aberration controlling optics 54 to correct any potential aberrations cause by propagation of the inspection light beam 56 across the illumination beam splitter 43.

Typically, a wavelength of the illumination beam is relatively short in order to enhance the imaging resolution (since the diffraction limit is proportional to the wavelength) while keeping a wavelength that can be measured using commercially available image sensors which are both cost- and size-accessible, such as a complementary metal-oxide-semiconductor (CMOS) sensor or a charge-coupled device (CCD), for instance. For example, the illumination source 42 can be embodied in a light-emitting diode (LED) emitting in the blue region, e.g. at about 470 nm. Indeed, such a blue light allows for an acceptable imaging resolution while being easily measured using conventional CMOS sensors or CCDs. Of course, other illumination sources and/or any other suitable spectral region within the visible spectrum, the near ultraviolet spectrum or the near infrared spectrum can be found suitable depending on the available components.

The optical power measurement device 22 acts on both the inspection light beam 56, which corresponds to the light beam caused by the reflection of illumination light on the connector endface 18 and which is in the field of view of the image sensor 50, and the signal light beam 57 which corresponds to light exiting the optical fiber(s) via the connector endface 18 and detected by the optical power detector 68. It comprises a relay lens system 58 to relay inspection light beam 56 toward the inspection microscope 10 and a power detection assembly 60, an output signal of which can be used to determine an optical power level of the signal light beam 57.

The relay lens system 58 is positioned along the imaging path 32 and is used to elongate the overall imaging path 32, 52 of the inspection microscope system 200 in order to accommodate the power detection assembly 60 therealong.

Thanks to the relay lens system 58, the connector endface 18 that should normally be positioned on the object plane 46 of the inspection microscope 10 for proper imaging, can be positioned away from the inspection end 15 of the inspection microscope 10, on an object plane 62 of relay lens system 58. In use, the relay lens system 58 produces on the object plane 46 of the inspection microscope 10, an image (real or virtual) of the connector endface 18 positioned on the object plane 62 of the relay lens system 58 (to within a focusing range of the imaging assembly 40).

The relay lens system 58 may be embodied by first converging lens 64, or other converging optics (such as multiple lenses, complex lens(es), mirror(s) or any combination thereof), at the first end 28 of the housing structure 26 (see FIG. 1C) and a second converging lens 66, or other converging optics, at the second end 30 of the housing structure 26.

Optionally, the relay lens system 58 may produce a magnification of 1× in order not to change the image produced on the image sensor 50, but different magnification factors can be envisaged depending on the desired result.

Although other configurations may be envisaged, optionally, light exiting the connector endface 18 may be collimated between the first converging lens 64 and the second converging lens 66 in order to ease its propagation toward the optical power detector 68. The inspection light beam 56 may or may not be collimated.

The power detection assembly 60 comprises an optical power detector 68 for measuring the optical power value of light exiting the connector endface 18 and beam redirection optics 70 disposed along the imaging path 32, between the connector endface 18 and objective lens 44 of the inspection microscope 10, and more specifically between the first converging lens 64 and the second converging lens 66.

Beam redirection optics 70 comprises one or more optical elements used to split at least part of light exiting the connector endface 18 from the inspection light beam to direct the at least part of light exiting the optical-fiber connector endface toward the optical power detector 68. It may be embodied by a power beam splitter (e.g., a 50/50 power beam splitter that separates light into two similar light beams), a dichroic beam splitter (by use of a dichroic coating) or a movable mirror that is either toggled in and out of the optical path or reoriented to direct the light beam toward a different direction.

The optical power measurement device 22 can be designed to operate either simultaneously with the inspection microscope 10 or in a sequential manner. If operated in the simultaneous manner, illumination and imaging of the endface 18 as well as optical power measurement are performed at the same time. As may be apparent to one skilled in the art, in the case of simultaneous measurements, a dichroic beam splitter may be used to separate the inspection light beam 56 returning from the connector endface 18 from the signal light beam 57, so as to avoid stray portions of the inspection light beam 56 giving rise to power measurement bias, for instance. Indeed, in this case, dichroic beam splitters can separate light associated with the optical telecommunication range (e.g. about 850 nm to 1625 nm) from light associated with the illumination range (e.g. about 380 nm to 700 nm). For example, a dichroic beam splitter may be used to transmit illumination light and corresponding inspection light beam 56, i.e. light associated with the illumination range (e.g. about 380 nm to 700 nm), and reflect light associated with the optical telecommunication range (e.g. about 850 nm to 1625 nm). Indeed, beam redirection optics 70 may be used to transmit illumination light from the illumination source 42 along the imaging path 32 and toward the connector endface 18, and split the returning inspection light beam 56 from the signal light beam 57, to direct them, respectively, to the inspection microscope 10 and to the optical power detector 68. Of course, it will be understood that, in other configurations such as, e.g., that of FIG. 3, transmission and reflection ranges may be interchanged.

If operated in a sequential manner, the imaging of the illuminated endface 38 is performed prior to or after the optical power measurement in a manner that does not necessitate the separating optics to have dichroic coating deposited thereon. In other words, the illumination source is shut off so that there is no illumination while measuring the optical power value associated with the tilted light. It is noted that optional anti-reflection coatings can be used irrespective of the manner of operation, i.e. simultaneous or sequential.

The optical power detector 68 is a photodetector suitable for measuring the optical power level of the signal light beam 57. Photodetectors generate an analog electrical current, which is to be converted into a digital optical power measurement value using a power measurement circuit (not shown in FIG. 2). As known in the art, the optical power detector 68 can be selected to detect light associated with the optical telecommunication range (e.g. about 850 nm to 1625 nm). More specifically, a detection range including wavelengths from about 1310 to 1625 nm will cover most singlemode applications. A detection range from about 850 to 1300 nm will cover most multimode applications. Of course, smaller ranges, e.g. around 1310 nm, 1550 nm, 850 nm or 1300 nm may cover more specific applications. Example of suitable technologies of photodetectors include Indium Gallium Arsenide (InGaAs) and germanium photodetectors.

It is understood that the spectral content of the imaging beam and of the signal light beam can vary depending on commercial applications.

A converging lens 72, or other converging optics, may be placed upstream from the optical power detector 68 to direct the signal light beam 57 on the surface of the optical power detector 68. Of course, other lenses, mirrors or other optical elements may be added along the optical path of the signal light beam to redirect, focus or otherwise act on the signal light beam before detection. As known in the art, in some embodiments, compensating optics and/or polarization diverse optical power detection may be added to compensate or overcome polarization dependent responsivity.

The power measurement circuit may comprise an amplification circuit, an analog-to-digital conversion circuit and a memory. The power measurement circuit can either be integrated in the housing structure 26 of the optical power measurement device 22 (see, e.g., FIG. 8), integrated within the housing of inspection microscope 10 (see, e.g., FIG. 9) or be built into a physically separate module. As described herein below, the optical power detector 68 may also be either integrated in the housing structure 26, in the housing of the inspection microscope 10 or built into a physically separate module (see FIG. 10).

Figure 3:
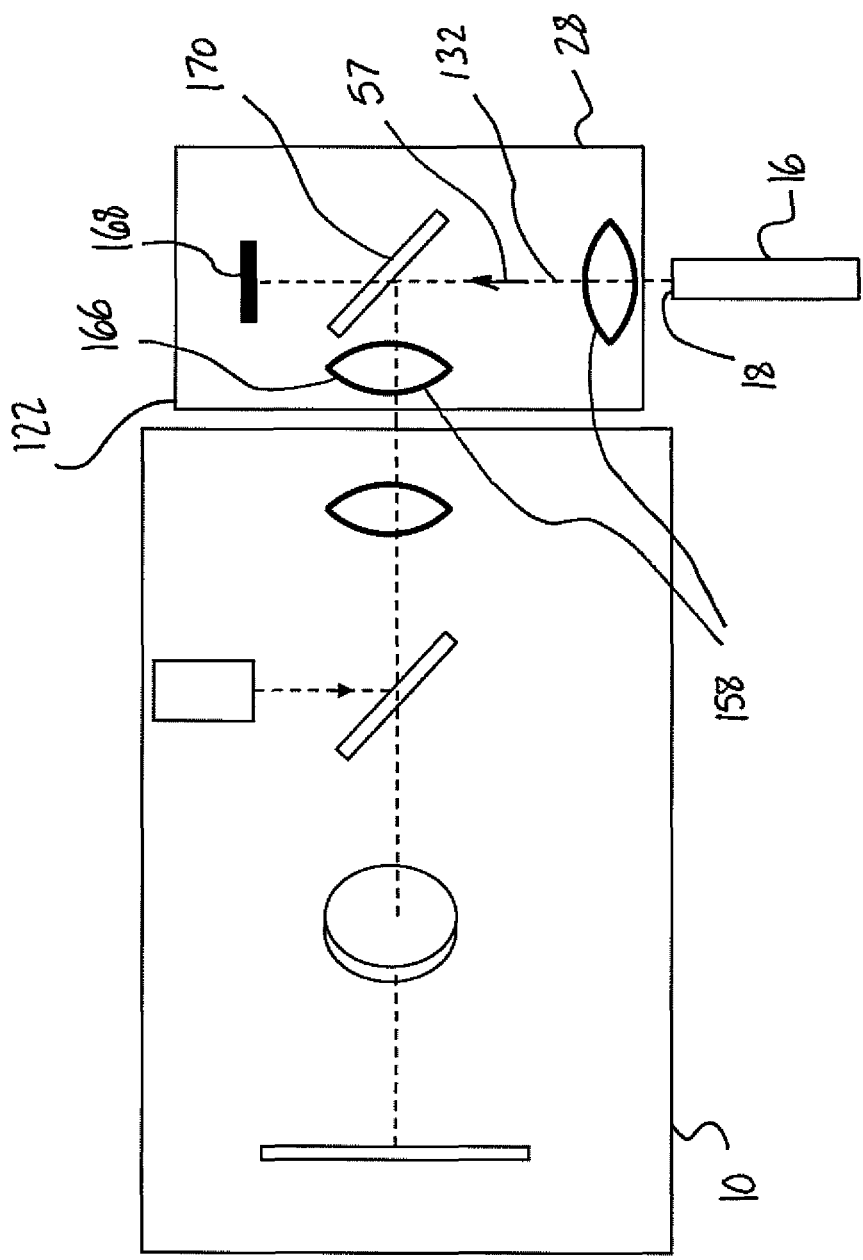
FIG. 3 is a schematic side view showing an optical configuration of an inspection microscope system in accordance with another embodiment in which the optical-fiber connector to be inspected is disposed at a 90-degree angle with regards to an imaging axis of the inspection microscope.
Figure 4:
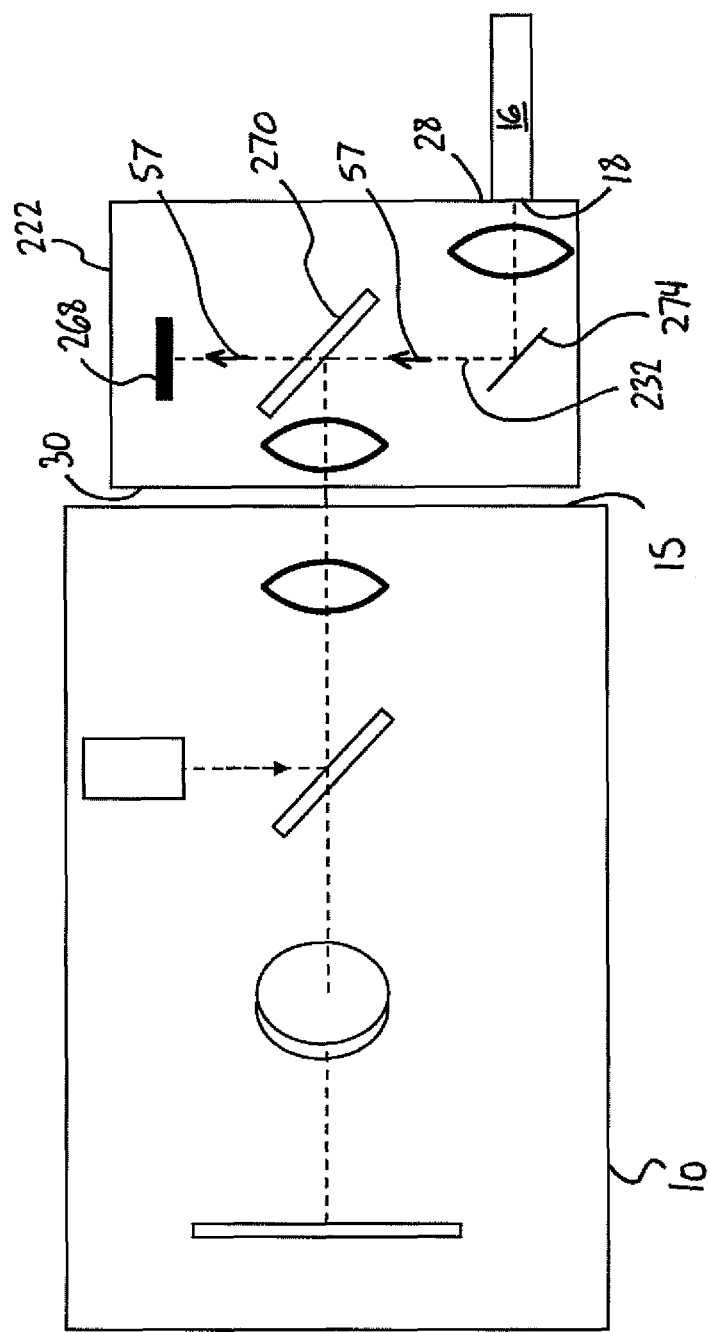
FIG. 4 is a schematic side view showing an optical configuration of an inspection microscope system in accordance with yet another embodiment in which a mirror is used to redirect the imaging path in the optical power measurement device.
Figure 5:
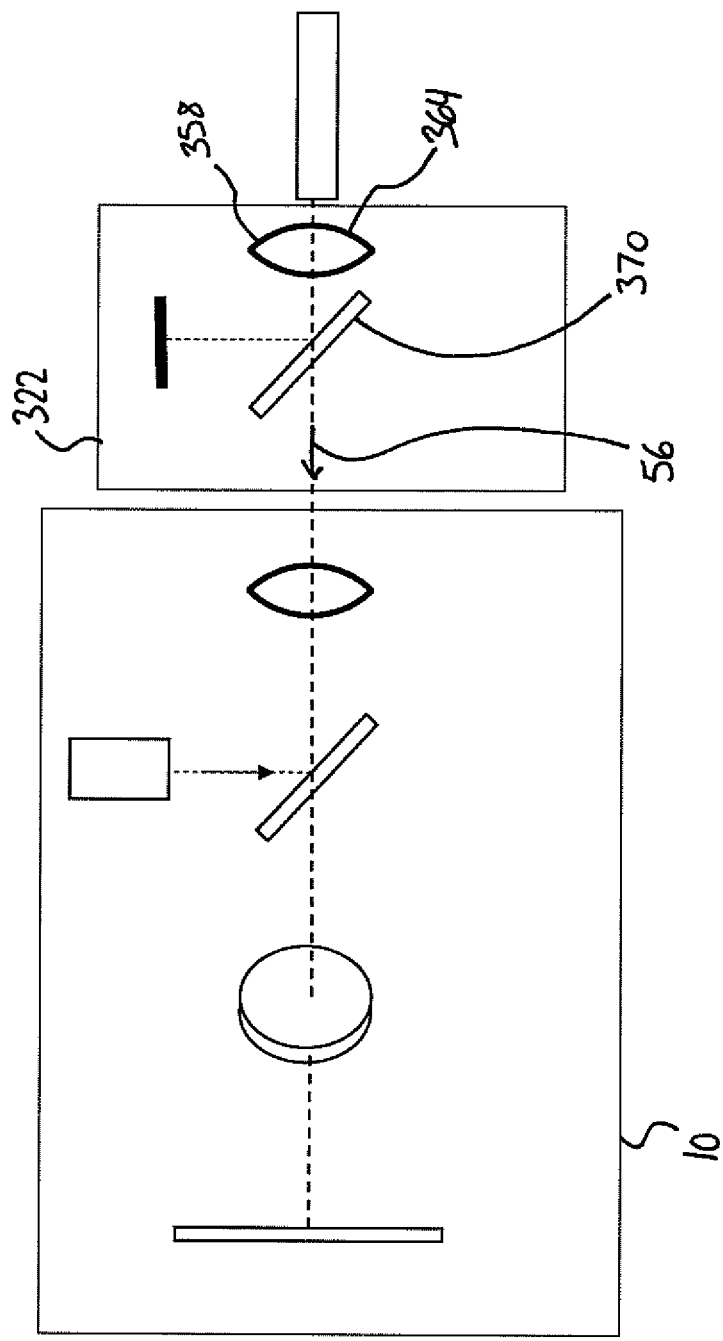
FIG. 5 is a schematic side view showing an optical configuration of an inspection microscope system in accordance with yet another embodiment in which a relay lens system of the optical power measurement device comprises a single lens.

Depending on the configuration of the optical power measurement device 22, the disposition of the relay lens system 58 and the power detection assembly 60 may vary, as described herebelow in FIGS. 3 to 5.

Now referring to FIG. 3, there is shown a schematic side view of another example of an optical configuration of an optical power measurement device 122 along with the inspection microscope 10 of FIG. 2. In the optical power measurement device 122, the first end 28 of the optical power measurement device 122 is oriented at a 90-degree angle relative to its second end 30 to receive the connector 16 or bulkhead adapter at a 90-degree angle relative to the orientation expected by the inspection microscope 10. Apart from the herein-noted differences, the optical power measurement device 122 is similar to the optical power measurement device 22 of FIG. 2 and like features are not be repeatedly described.

The optical power measurement device 122 comprises a relay lens system 158 to relay inspection light beam 56 toward the inspection microscope 10 and a power measurement assembly 160 to determine an optical power level of the signal light beam 57. The relay inspection light beam 56 comprises a first converging lens 164 at the first end 28 and a second converging lens 166 at the second end 30. The power detection assembly 60 comprises an optical power detector 168 for measuring the optical power value of light exiting the connector endface 18 and beam redirection optics 170 disposed along the imaging path 132, between the connector endface 18 and the objective lens 44 of the inspection microscope 10, and more specifically between the first converging lens 164 and the second converging lens 166. The beam redirection optics 170 is configured to redirect at a 90-degree angle, via reflection, illumination light received at the second end 30, toward the first end 28, whereas the signal light beam 57 is transmitted through the beam redirection optics 170 toward the optical power detector 168. It will be appreciated that although the mechanical disposition of the elements is different, the functions achieved by the optical power measurement device 122 of FIG. 3 are the same as that of the optical power measurement device 22 of FIG. 2.

Now referring to FIG. 4, there is shown a schematic side view of another example of an optical configuration of an optical power measurement device 222 along with the inspection microscope 10 of FIG. 2. In optical power measurement device 222, the orientation of the first end 28 is parallel with the second end 30 and the inspection end 15 of the inspection microscope 10 but is offset relative to the second end 30. Apart from the noted differences, the optical power measurement device 222 is similar to the optical power measurement device 22 of FIG. 2 and like features are not be repeatedly described.

The beam redirection optics 270 of FIG. 3 comprises a mirror 274 positioned at a 45-degree angle relative to the imaging path 232 to deflect the imaging path 232 towards the first end 28. As in FIG. 3, the beam redirection optics 270 is configured to redirect at a 90-degree angle, via reflection, illumination light received at the second end 30, toward the first end 28, whereas the signal light beam 57 is transmitted through the beam redirection optics 270 toward the optical power detector 268. It will be understood that the orientation of the mirror 274 may vary and that various other configurations and orientations of mirror(s) may be used to redirect the imaging path 232 towards any required position and/or orientation of the first end 28 relative to the second end 30. Furthermore, depending on the desired configuration, the mirror 274 or multiple mirrors may be oriented so that an orientation of the connector 16 relative to the inspection microscope 10 not be in the same plane.

Now referring to FIG. 5, there is shown a schematic view of another example of an optical configuration of an optical power measurement device 322 along with the inspection microscope 10 of FIG. 2. In optical power measurement device 322, a relay lens system 358 comprises a single converging lens 364. In this case, to accommodate a minimum distance to insert a beam redirection optics 370, a focal point of the inspection light beam 56 may be located inside the optical power measurement device 322. The single converging lens 364 may produce an image of the optical-fiber connector endface to be inspected at the focal point which corresponds to the object plane of the optical-fiber connector endface inspection microscope. Apart from the noted differences, the optical power measurement device 322 is similar to the optical power measurement device 22 of FIG. 2 and like features are not be repeatedly described.

It will be appreciated that although the mechanical disposition of the elements in FIGS. 3 to 5 are different, the functions achieved by the optical power measurement devices 122, 222 and 322 of FIGS. 3, 4 and 5, respectively, are the same as that of the optical power measurement device 22 of FIG. 2.

One skilled in the art will understand that some additional electronic components that are not illustrated in FIGS. 2 to 11 may be required to operate the inspection microscope and the optical power measurement device. Electronic components that are commonly known in the art of inspection microscope are not discussed herein and it is considered implicit that the inspection microscope may include, for example, an integrated or separate display (e.g., via a dedicated viewing device or via a generic computing device such as a personal computer, a tablet or a smart phone), an integrated or separate processing module (e.g., in a dedicated viewing device or a generic computing device such as a personal computer, a tablet or a smart phone) and one or more communication modules such as, e.g., Bluetooth, Wi-Fi and/or Universal Serial Bus (USB).

Power measurement results obtained via the optical power measurement device 22, 122, 222 or 322 may be either displayed directly on a display or pass/fail indicators (e.g. LED indicators) provided on the extension unit 24 (see FIG. 1), communicated to the inspection microscope 10 for analysis and/or display or communicated to a separate device (e.g., a dedicated viewing device or a generic computing device such as a personal computer, a tablet or a smart phone), for analysis, display or other output to a user.

The optical power detector 68 or 168 generates an analog electrical signal, which needs to be converted into a digital optical power measurement value using a power measurement circuit. It will be understood that such power measurement circuit may comprise an amplification circuit, an analog-to-digital conversion circuit and a memory, as known in the art. Various examples of electric configurations of the optical power measurement device are described with reference to FIGS. 6 to 9.

Figure 6:
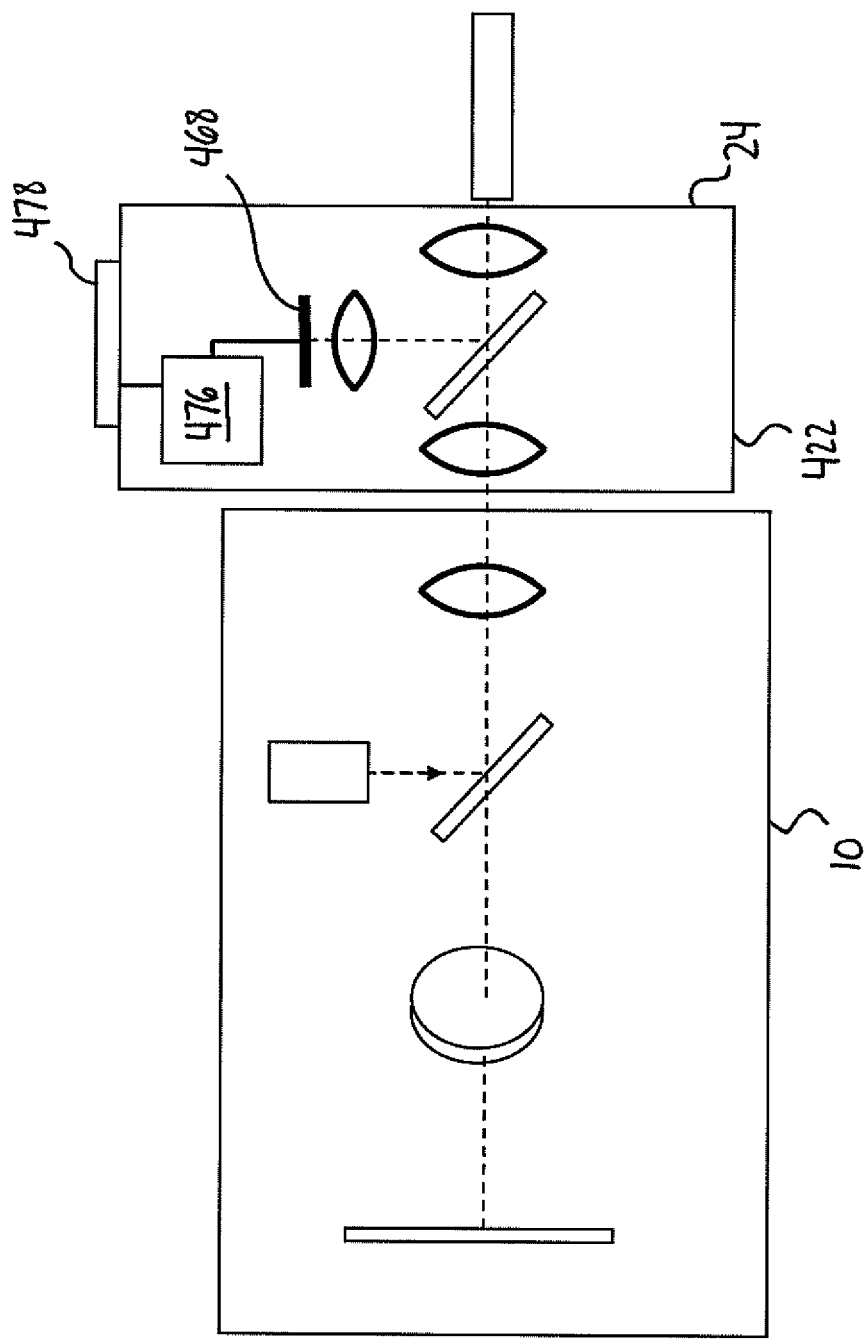
FIG. 6 is a schematic side view of an inspection microscope system in accordance with another embodiment in which the optical power measurement device comprises a power measurement circuit and a display, both embedded in the optical power measurement device.

FIG. 6 shows a schematic side view of an embodiment of an inspection microscope system in which an optical power measurement device 422 comprises a power measurement circuit 476 and a display 478, both embedded in the extension unit 24 of the optical power measurement device 422, such that power measurement values are made readily viewable by a user on the extension unit 24.

Figure 7:
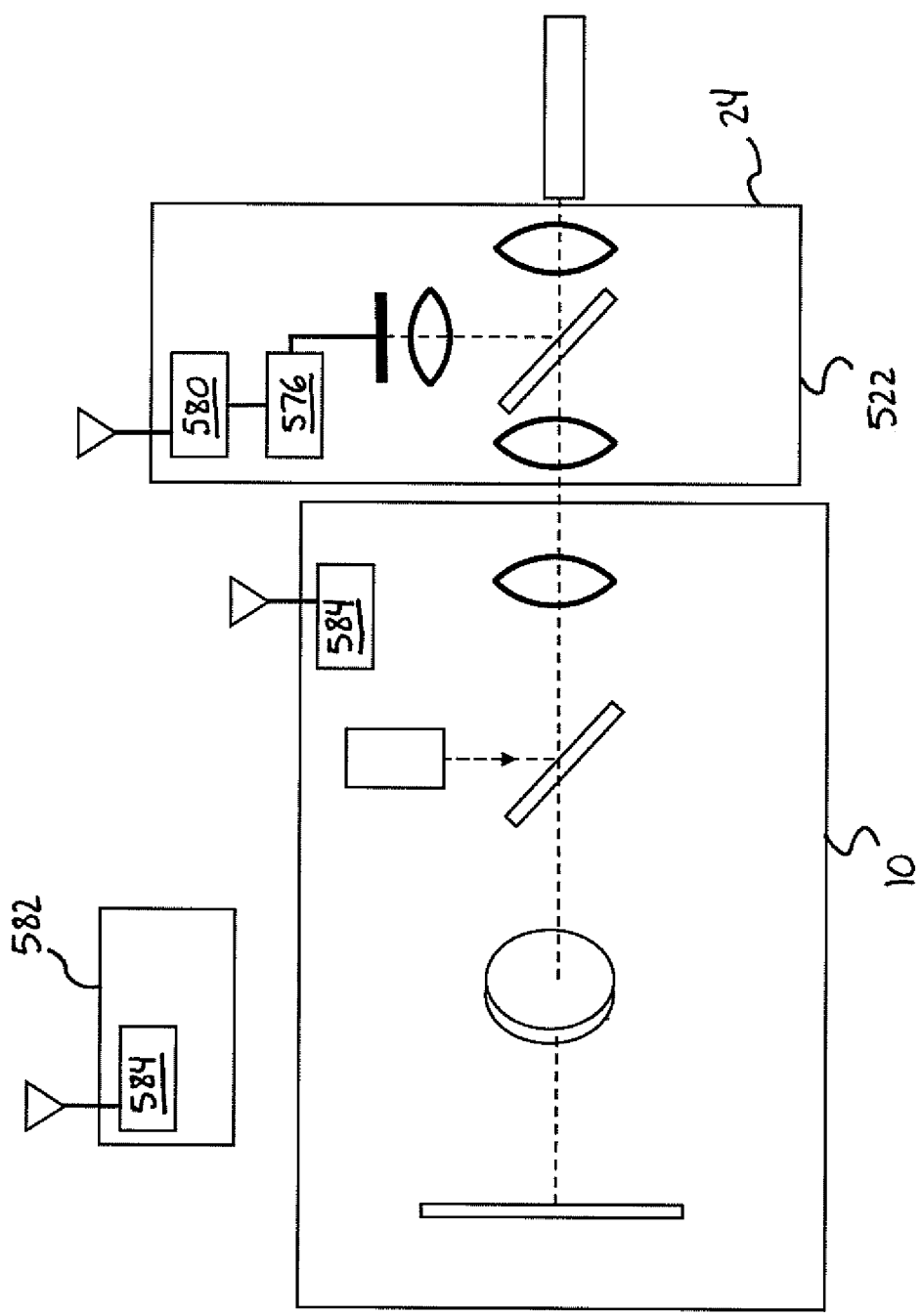
FIG. 7 is a schematic side view of an inspection microscope system in accordance with another embodiment in which the optical power measurement device comprises a power measurement circuit and a wireless communication module embedded in the optical power measurement device.

FIG. 7 shows a schematic side view of another embodiment of an inspection microscope system in which the optical power measurement device 522 comprises a power measurement circuit 576 and a wireless communication module 580 (such as Bluetooth, Wi-Fi, Radio Frequency (RF) and/or infrared) embedded in the extension unit 24 of the optical power measurement device 522. The wireless communication module 580 serves to communicate measured power measurement values to the inspection microscope 10 or to a separate display device 582 (e.g., a dedicated display device or a generic computing device such as a personal computer, a tablet or a smart phone for instance) via a corresponding communication module 584, for display and optional analysis or other output to a user.

In a variant of the embodiment of FIG. 7 (not shown), the wireless communication between the power measurement circuit 576 and the inspection microscope 10 may be replaced by a wired communication via a cable connection between the power measurement circuit 576 and the inspection microscope 10.

Figure 8:
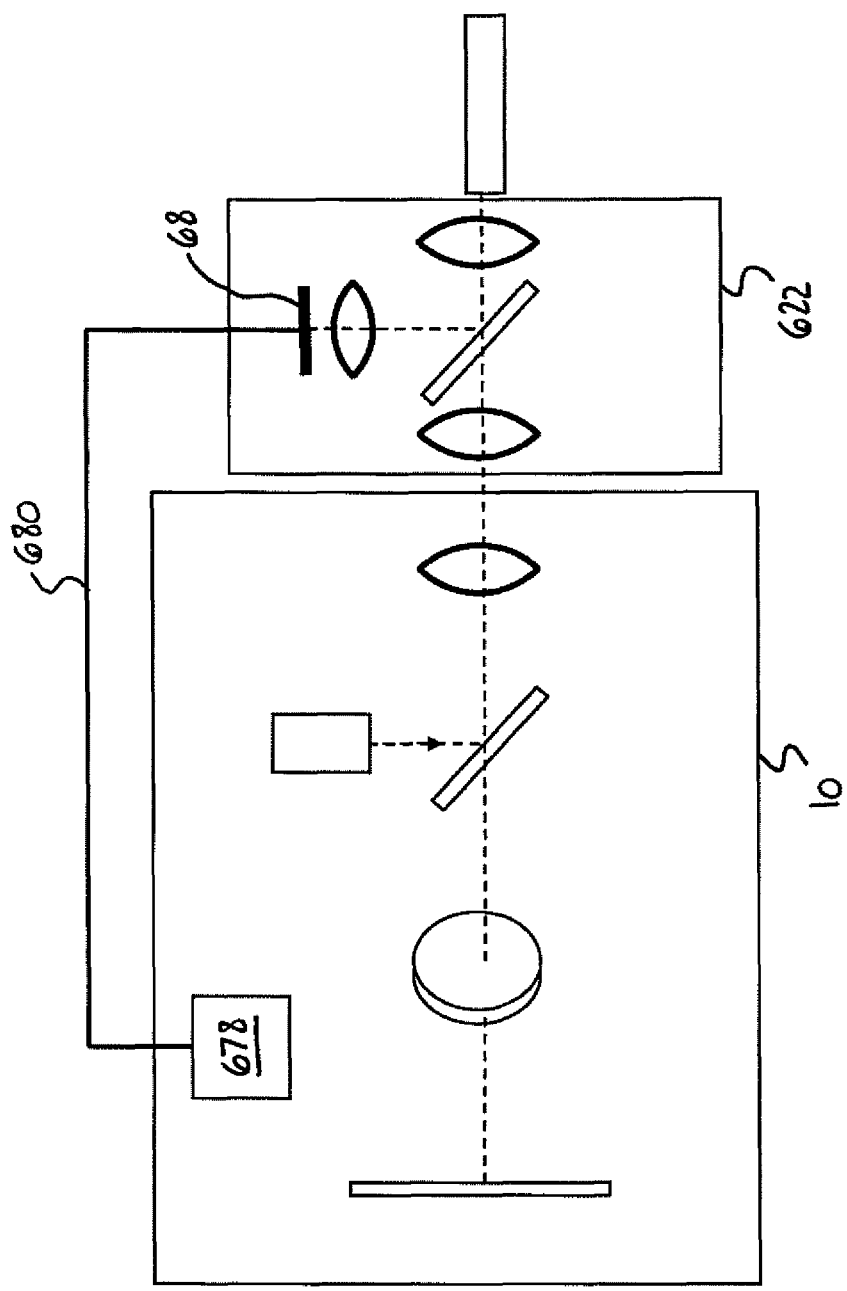
FIG. 8 is a schematic side view of an inspection microscope system in accordance with another embodiment in which a power measurement circuit is embedded in the housing of the inspection microscope.

FIG. 8 shows a schematic side view of another embodiment of an inspection microscope system in which a power measurement circuit 678 is embedded in the housing of the inspection microscope 10. In this case, an optical power measurement device 622 comprises an optical power detector 68 and the analog electrical current from the optical power detector 68 is electrically conveyed to the power measurement circuit 678 via an electrical connection 680. The analog electrical current from the optical power detector 68 is remotely converted into a digital optical power measurement value via the power measurement circuit 678 embedded in the inspection microscope 10.

Figure 9:
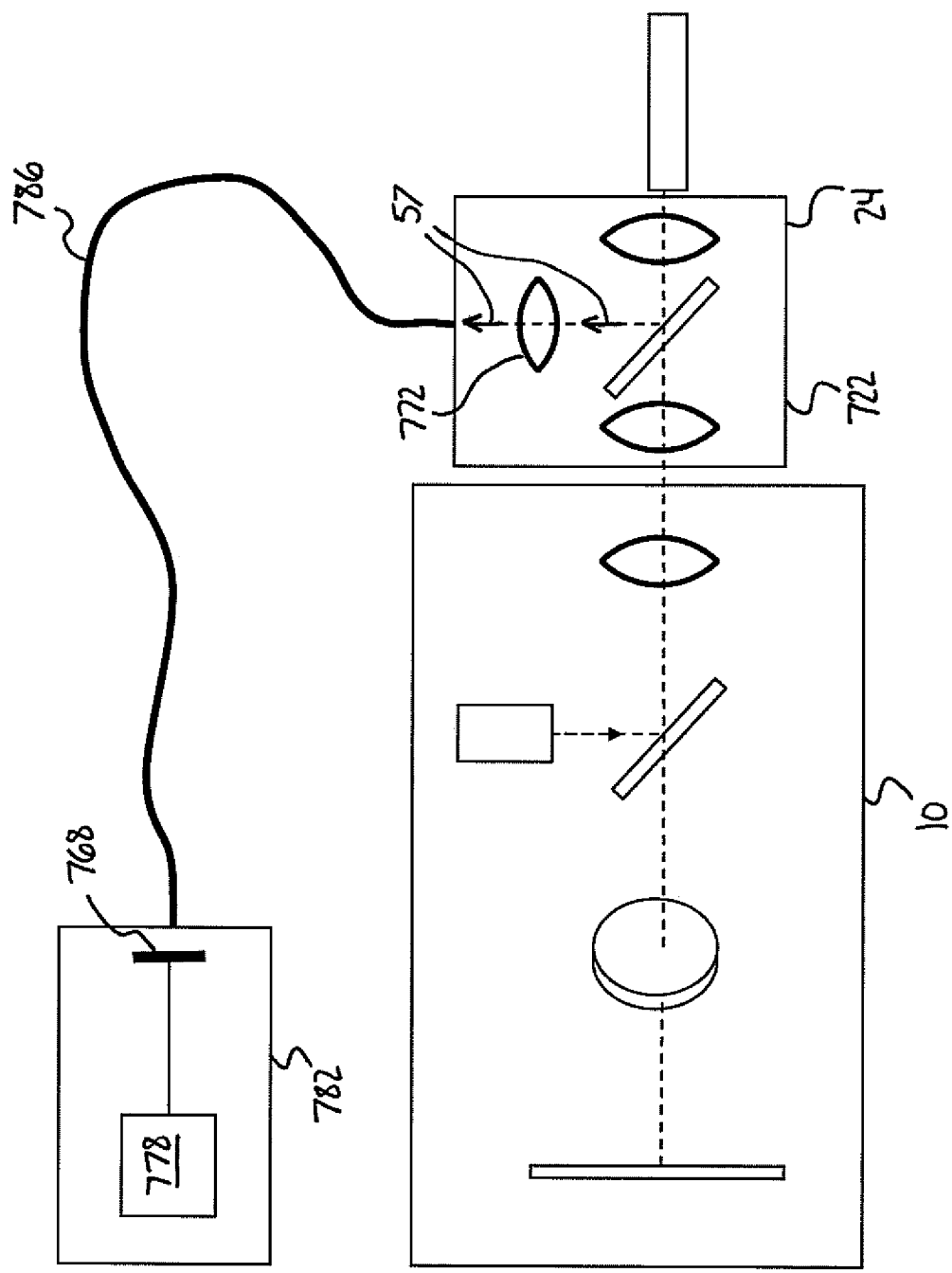
FIG. 9 is a schematic side view of an inspection microscope system in accordance with another embodiment in which the signal light beam is coupled into an optical waveguide for remote detection.

FIG. 9 shows a schematic side view of yet another embodiment of an inspection microscope system comprising an optical power measurement device 722 in which the signal light beam 57 is coupled into an optical waveguide 786 such as a single-mode or a multimode optical fiber or any other light guide, for remote detection in a separate device 782 comprising an optical power detector 768 and a power measurement circuit 778. The optical power measurement device 722 comprises coupling optics 772, such as, e.g., a gradient-index (GRIN) lens, to capture the signal light beam 57 and inject it into a cut end of the optical waveguide 786. Light is propagated to the separate device 782 where it exits the optical waveguide 786 toward the optical power detector 768. The optical power measurement device 722 of FIG. 9 has the advantage of not requiring electrification of the extension unit 24.

It will be understood that the embodiments of FIGS. 2 to 8 may require electrical power to be supplied to the extension unit 24. Such power may be provided by an onboard battery which may be rechargeable, e.g., via a releasably connectable cable, or replaceable. In another embodiment, the inspection microscope 10 may supply power to the extension unit 24 via, e.g., a cable or electrical contacts between the inspection microscope 10 and the extension unit 24.

The inspection microscope systems and optical power measurement devices described herein with reference to FIGS. 1 to 9 may be used to measure the optical power of light exiting both non-angled polished and angled-polished connectors. It will be understood that the endface of a non-angled polished optical-fiber connector causes light propagating in the optical fiber(s) to exit the connector endface in a diverging signal light beam 57 of which the mean propagation direction is perpendicular to the connector endface 18 (i.e. in continuity with the propagation axis of the optical fiber(s)). The connector endface of an angled polished optical-fiber connector has an angled ferrule end that is not perpendicular to the propagation axis of the optical fiber(s). A connector-mating interface tip adapted for angled-polished optical-fiber connectors typically has a mating interface that is configured such that the angle-polished endface would be perpendicular to an imaging path 32 of the inspection microscope 10 in order to suitably image the connector endface. An angle-polished connector endface causes a mean propagation direction of the signal light beam 57 exiting the endface to be tilted relative to both the propagation axis of the optical fiber(s) and the imaging path 32 of the inspection microscope 10. In some embodiments, a significant portion of the signal light beam 57 may not reach the relay lens system of the power measurement device. In this case, a lens can be provided in the interface tip 12, as described in U.S. Pat. No. 9,915,790, hereby incorporated by reference, to capture the signal light beam 57 and direct it toward the relay lens system.

Figure 10:
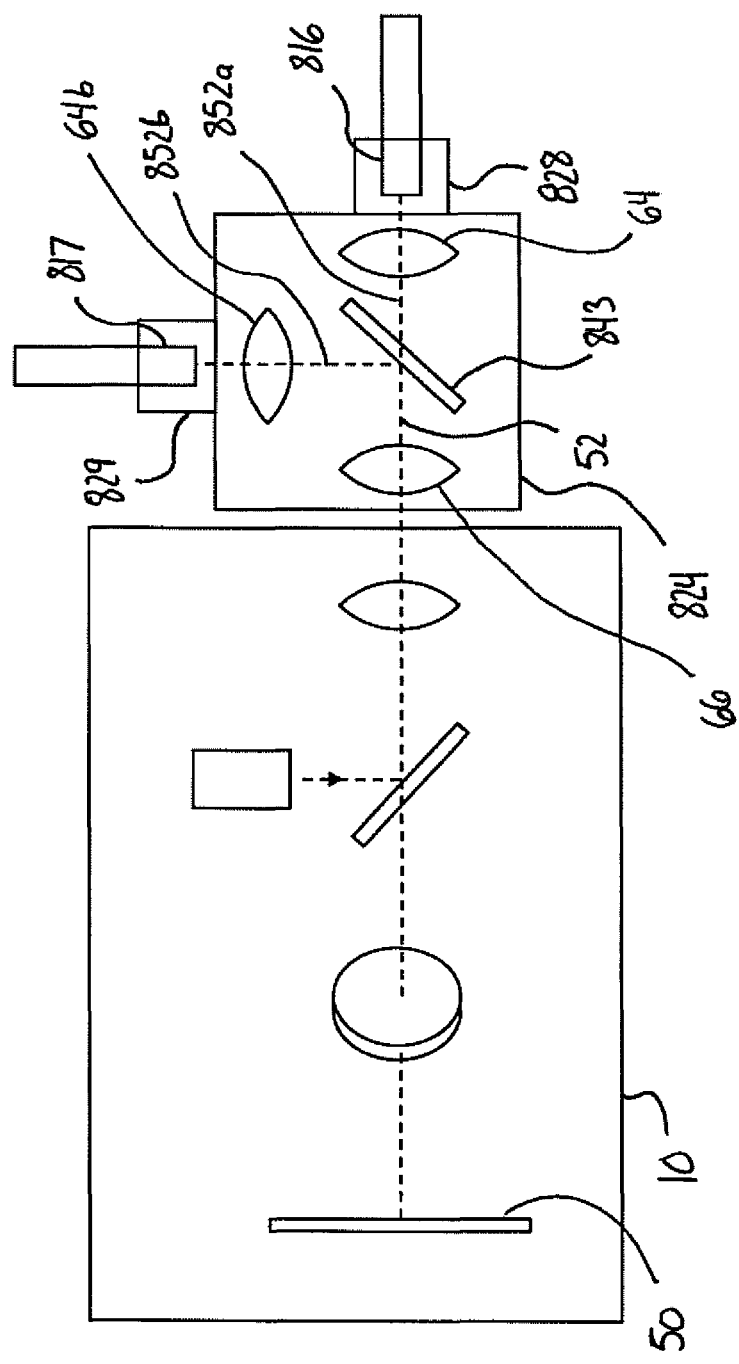
FIG. 10 is a schematic side view of an inspection microscope system in accordance with another embodiment in which an extension unit comprises two imaging ports to allow imaging of two optical fiber connectors.

Now referring to FIG. 10, there is shown a schematic side view of another example of an inspection microscope system comprising an extension unit 824 which comprises two imaging ports to allow imaging of two optical fiber connectors. The extension unit 824 comprises the relay lens system 58 as described hereinabove and an beam splitter 843 inserted along the imaging path 32 between the first converging lens 64 and the second converging lens 66 of the relay lens system 58 in order to allow imaging of two optical fiber connectors either simultaneously or sequentially.

The extension unit 824 has a first imaging port 828 and a second imaging port 829 to respectively receive the patch panel connector 816 and the loose connector 817. The beam splitter 843 is used to split the imaging path 52 into two imaging paths 852a, 852b to image both connectors. A second relay lens system 58b is comprises the second converging lens 66 and a third converging lens 64b.

In one embodiment, a single connector is mated to the extension unit 824 at a time to prevent the superimposition on the image sensor 50 of images from the two endfaces. In another embodiment, the beam splitter 843 is replaced by a movable mirror. Toggling between the two imaging ports 828, 829 may be provided by flipping the movable mirror in and out of the imaging path 52 to redirect it toward either the first imaging port 828 or the second imaging port 829.

Prior to mating two connectors, their respective endfaces should be inspected. One of the two connectors to be mated is typically recessed in a patch panel and accessible via a bulkhead adapter, where the other is the end of a patch cord connector that is to be inserted in the bulkhead adapter for connection to the patch panel. Prior art optical-fiber connector endface inspection microscopes are configured to inspect a single endface at a time. As such, inspection of both connectors to be together mated is performed by either alternately connecting each connector to the inspection microscope or by using two separate inspection microscopes. A drawback of the alternate connection method is that the two connectors do not have the same mechanical configuration (one is a loose connector and the other is recessed in a patch panel). A different interface tip 12 (see FIG. 1) is therefore required for each connector, requiring additional manipulation to change the interface tip 12 between inspections. Switching tips can be a lengthy operation and may cause tip loss issues. The configuration of FIG. 10 can advantageously use a single device to inspect both connectors (loose/patch cord and patch panel).

Figure 11:
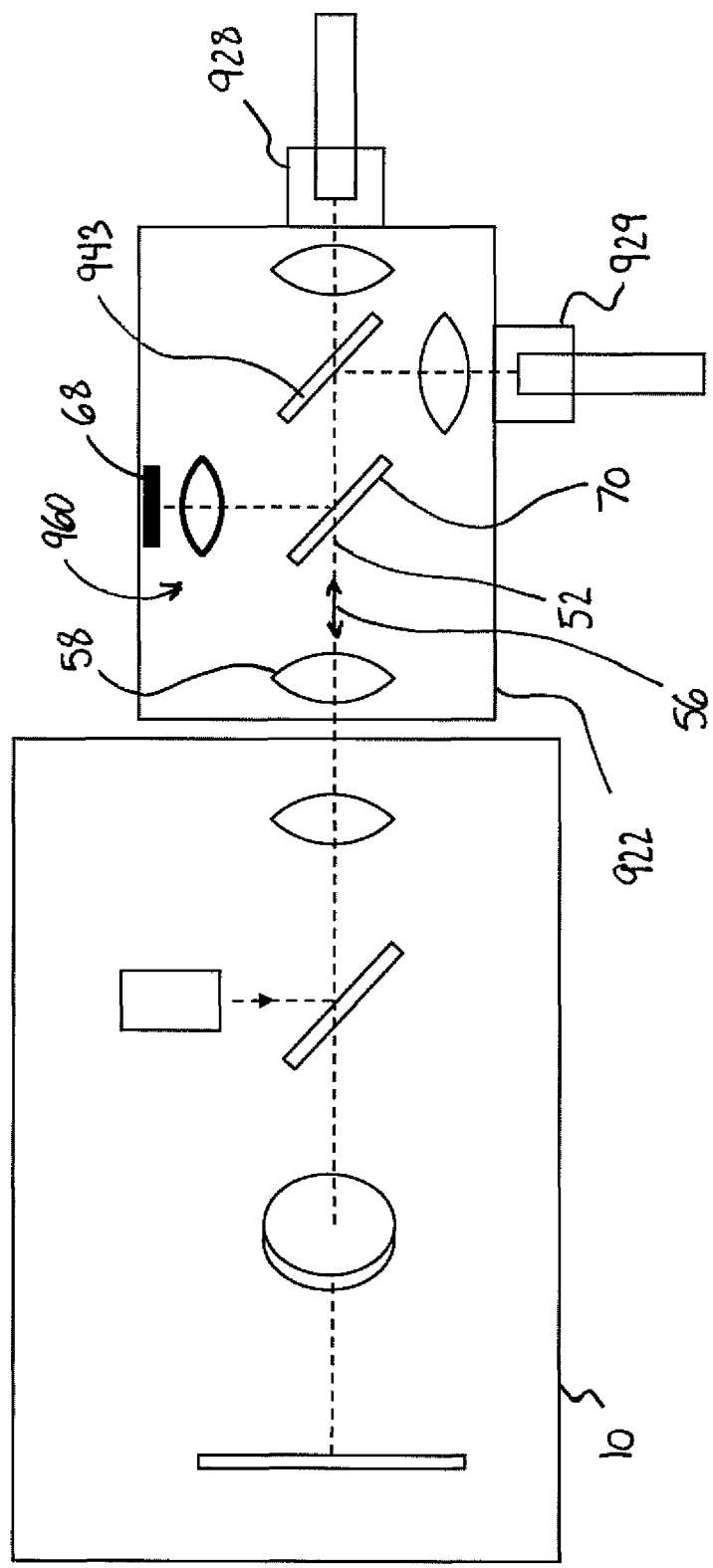
FIG. 11 is a schematic side view of an inspection microscope system in accordance with another embodiment in which the optical power measurement device comprises two imaging ports.

FIG. 11 shows a schematic side view of another embodiment of an inspection microscope system in which an optical power measurement device 922 combines the optical power measurement device 22 of FIG. 2 with the two-port extension unit 824 of FIG. 10. Along the imaging path 52, the optical power measurement device 922 comprises a beam splitter 943 that splits the imaging path 52 toward the two imaging ports 928, 929, as well as a power measurement assembly 960 comprising an optical power detector 68 and beam redirection optics 70.

The embodiments described above are intended to be exemplary only. The scope of the invention is therefore intended to be limited solely by the appended claims.

What is claimed is:

1. An optical power measurement device for use with an optical-fiber connector endface inspection microscope having, at an inspection end, objective optics defining an object plane, comprising:
   a housing structure comprising:
      a first end connectable toward an optical-fiber connector endface to be inspected; and
      a second end toward the inspection end of said optical-fiber connector endface inspection microscope;
   an imaging path within said housing structure between said first end and said second end along which an inspection light beam reflected from the optical-fiber connector endface propagates toward the second end;
   a relay lens system along the imaging path, comprising at least first converging optics at said first end, said relay lens system being configured to produce an image of the optical-fiber connector endface to be inspected on an object plane of the optical-fiber connector endface inspection microscope;
   an optical power detector; and
   beam redirection optics disposed along the imaging path between the optical-fiber connector endface to be inspected and objective optics of said optical-fiber connector endface inspection microscope, said beam redirection optics being configured to split at least part of light exiting the optical-fiber connector endface from the inspection light beam to direct the at least part of light exiting the optical-fiber connector endface toward said optical power detector.

2. The optical power measurement device as claimed in claim 1, wherein said housing structure is releasably connectable to a microscope housing of the optical-fiber connector endface inspection microscope via said second end.

3. The optical power measurement device as claimed in claim 1, wherein said first end of said housing structure is releasably connectable to a connector-mating interface tip adapted to connect to an optical-fiber connector endface to be inspected.

4. The optical power measurement device as claimed in claim 3, wherein said housing structure is releasably connectable to a microscope housing of the optical-fiber connector endface inspection microscope via said second end; and wherein said connector-mating interface tip is releasably connectable to said inspection end of the optical-fiber connector endface inspection microscope in absence of the optical power measurement device.

5. The optical power measurement device as claimed in claim 1, wherein said optical power detector is disposed within said housing structure.

6. The optical power measurement device as claimed in claim 1, wherein said optical power detector is external to said housing structure and said optical power measurement device further comprises an optical waveguide connected to said housing structure, and coupling optics disposed within said housing structure and configured to couple said at least part of light exiting the optical-fiber connector endface to said optical waveguide.

7. The optical power measurement device as claimed in claim 1, wherein a magnification factor associated with said relay lens system is 1×.

8. The optical power measurement device as claimed in claim 1, wherein said relay lens system further comprises second converging optics at said second end.

9. An optical-fiber connector endface inspection microscope and optical power measurement system, comprising:
- an optical-fiber connector endface inspection microscope having objective optics at an inspection end; and
- optical power measurement device comprising:
    - a housing structure comprising:
        - a first end connectable toward an optical-fiber connector endface to be inspected; and
        - a second end toward the inspection end of said optical-fiber connector endface inspection microscope;
    - an imaging path within said housing structure between said first end and said second end along which an inspection light beam reflected from the optical-fiber connector endface propagates toward the second end;
    - a relay lens system along the imaging path, comprising at least a first converging optics at said first end, said relay lens system being configured to produce an image of the optical-fiber connector endface to be inspected on an object plane of the optical-fiber connector endface inspection microscope;
    - an optical power detector; and
    - beam redirection optics disposed along the imaging path between the optical-fiber connector endface to be inspected and objective optics of said optical-fiber connector endface inspection microscope, said beam redirection optics being configured to split at least part of light exiting the optical-fiber connector endface from the inspection light beam to direct the at least part of light exiting the optical-fiber connector endface toward said optical power detector.

10. The system as claimed in claim 9, wherein the optical-fiber connector endface inspection microscope comprises an imaging assembly comprising said objective optics and an image detector, the imaging assembly being configured to illuminate the optical-fiber connector endface and to image the optical-fiber connector endface on said image detector for inspection thereof.

11. The system as claimed in claim 9, wherein said housing structure is releasably connectable to a microscope housing of the optical-fiber connector endface inspection microscope via said second end.

12. The system as claimed in claim 9, wherein said first end of said housing structure is releasably connectable to a connector-mating interface tip adapted to connect to an optical-fiber connector endface to be inspected.

13. The system as claimed in claim 12, wherein said housing structure is releasably connectable to a microscope housing of the optical-fiber connector endface inspection microscope via said second end; and wherein said connector-mating interface tip is releasably connectable to said inspection end of the optical-fiber connector endface inspection microscope in absence of the optical power measurement device.

14. The system as claimed in claim 9, wherein said optical power detector is disposed within said housing structure.

15. The system as claimed in claim 9, wherein said optical power detector is external to said housing structure and said optical power measurement device further comprises an optical waveguide connected to said housing structure, and coupling optics disposed within said housing structure and configured to couple said at least part of light exiting the optical-fiber connector endface to said optical waveguide.

16. A method for inspecting an optical-fiber connector endface and measuring an optical power of light exiting the optical-fiber connector endface, the method comprising:
- connecting an optical power measurement device between an inspection end of an optical-fiber connector endface inspection microscope and a connector-mating interface tip;
- connecting an optical-fiber connector endface to be inspected to said connector-mating interface tip;
- defining an imaging path within a housing structure of the optical power measurement device, between said optical-fiber connector endface and objective optics of said optical-fiber connector endface inspection microscope, to convey an inspection light beam reflected from the optical-fiber connector endface toward said objective optics;
- producing an image of the optical-fiber connector endface to be inspected on an object plane of the optical-fiber connector endface inspection microscope via a pair of converging lenses;
- capturing an image of the optical-fiber connector endface via the optical-fiber connector endface inspection microscope, for inspection thereof;
- splitting at least part of light exiting the optical-fiber connector endface from the inspection light beam to direct the at least part of light exiting the optical-fiber connector endface toward an optical power detector, via a beam redirection element disposed along the imaging path between the optical-fiber connector endface to be inspected and said objective optics of said optical-fiber connector endface inspection microscope; and
- determining an optical power value of said light exiting the optical-fiber connector endface from an output of the optical power detector.

* * * * *